United States Patent [19]

Yamamoto

[11] Patent Number: 4,770,913
[45] Date of Patent: Sep. 13, 1988

[54] BINDER

[76] Inventor: Takao Yamamoto, 12-20, Higashinakahama 2-chome, Jyoto-ku, Osaka, Japan

[21] Appl. No.: 866,469

[22] Filed: May 23, 1986

[30] Foreign Application Priority Data

| May 25, 1985 | [JP] | Japan | 60-112492 |
| Jul. 26, 1985 | [JP] | Japan | 60-166356 |
| Dec. 25, 1985 | [JP] | Japan | 60-294807 |

[51] Int. Cl.$^4$ .................................... C09J 7/02
[52] U.S. Cl. ...................... 428/40; 428/214; 428/354; 604/390
[58] Field of Search .......... 428/40, 41, 42, 343, 428/354, 352, 214; 402/79; D20/22; 604/389, 390

[56] References Cited

U.S. PATENT DOCUMENTS

| 25,819 | 7/1896 | Foster | D20/22 |
| 246,591 | 12/1977 | Sollazzi | D20/22 |
| 2,601,125 | 6/1952 | O'Connor | 402/79 |
| 3,900,642 | 8/1975 | Michel | 428/40 |
| 4,097,627 | 6/1979 | Nemeth et al. | 604/390 |
| 4,144,887 | 3/1979 | Milnamow | 604/390 |
| 4,153,747 | 5/1979 | Young et al. | 428/40 |
| 4,500,021 | 2/1985 | Bildusas | 428/40 |
| 4,522,853 | 6/1985 | Szonn et al. | 604/390 |
| 4,670,012 | 6/1987 | Johnson | 602/390 |

FOREIGN PATENT DOCUMENTS

85/04602  10/1985  PCT Int'l Appl. ............. 428/194

Primary Examiner—John E. Kittle
Assistant Examiner—Beth A. Bozzelli
Attorney, Agent, or Firm—Wenderoth, Lind & Ponack

[57] ABSTRACT

Improved binders or binding seals are proposed which have a substrate of a flexible material. At one end of the substrate is provided an ordinary adhesive layer and at the other end is provided a peelable adhesive layer covered with an ordinary adhesive layer. The peelable adhesive layer allows the user to stick the end of the binder and peel it whenever desired. The binder may be formed with a hole or holes at one end to secure it to a file, and with a peelable adhesive layer at the other end so that a document can be stuck and peeled on and from it.

6 Claims, 2 Drawing Sheets

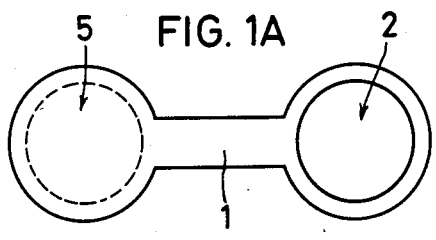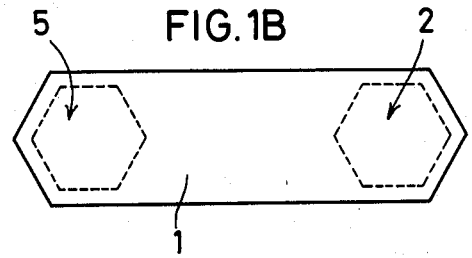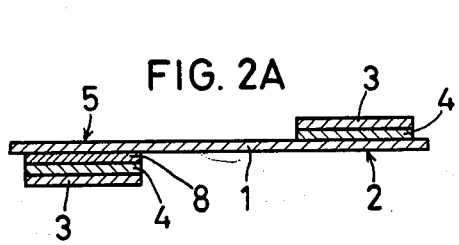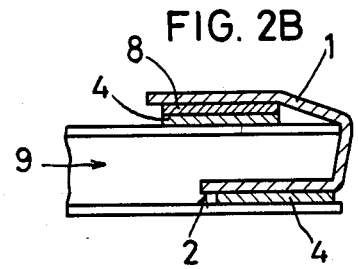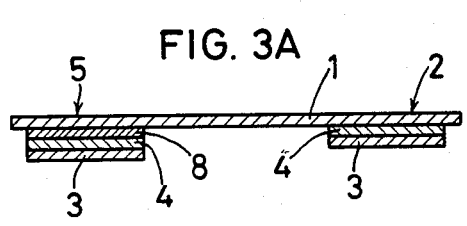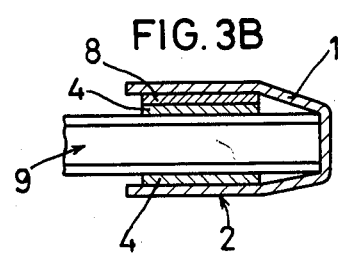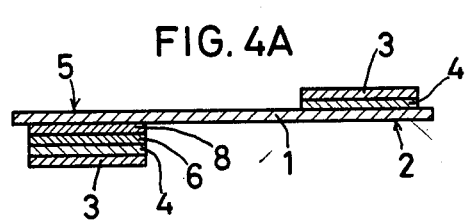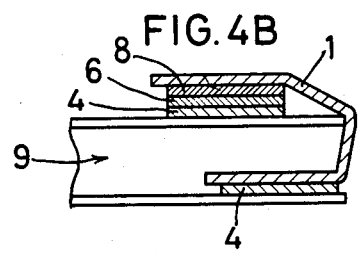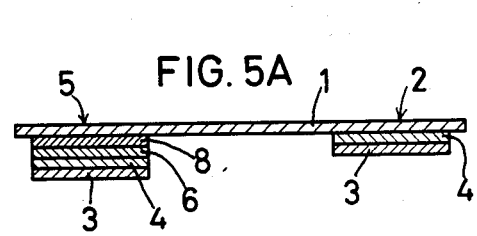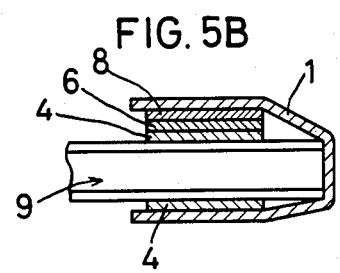

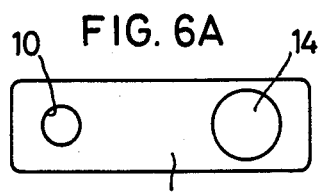
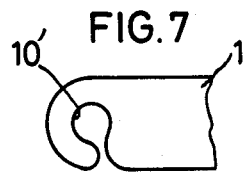
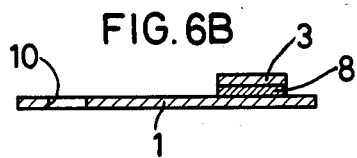
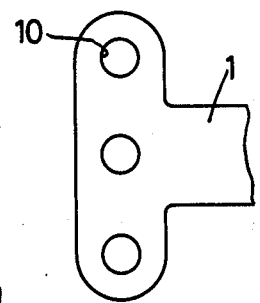
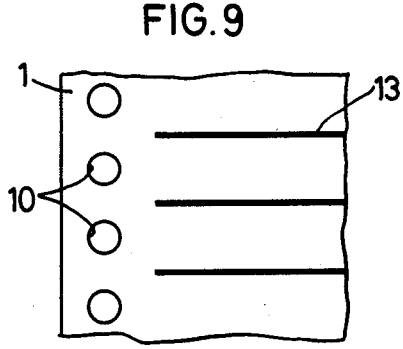
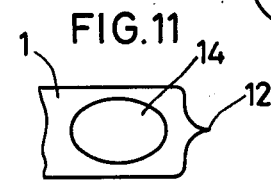
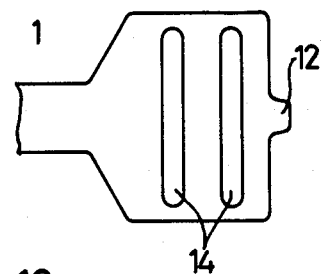
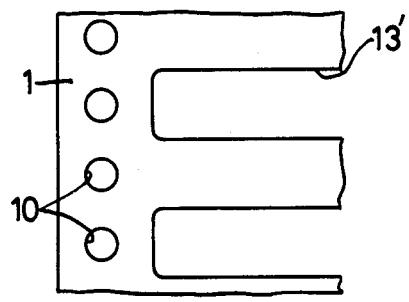
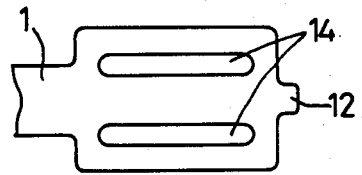
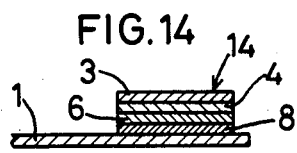
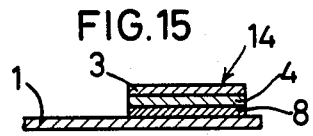

BINDER

The present invention relates to a binder or seal for document files, envelopes, books, packages, etc.

As conventional binders, buttons, snaps, hooks, eyelets, fasteners, seals, rubber bands, strings, adhesive tapes, etc. are used. Some of them allow repeated use, but others do not. Also, some of them take up much space; some are troublesome to use; some mar the surface of the object bound; some are liable to be lost.

An object of the present invention is to provide a binder which obviates such shortcomings.

In accordance with the present invention, there is provided a binder which has a substrate of a flexible material, the substrate having one end covered with an ordinary adhesive layer and the other end covered with a peelable adhesive layer and an ordinary adhesive layer.

A film layer may be provided between the ordinary adhesive layer and the peelable adhesive layer.

According to the other aspect of the present invention, the substrate is formed with at least one hole at one end thereof and has the other end thereof covered with a peelable adhesive layer, or a peelable adhesive layer and an ordinary adhesive layer.

The binder according to the present invention does not take up much space because it has a strip of substrate of a flexible material. It is easy to use because all one has to do is to stick and peel its one end. Further, it is not liable to be lost because one end of the binder is secured to the article to be bound. The article cannot be marred because adhesion and peeling are merely repeated at the other end of the substrate. The use of a peelable adhesive layer makes possible such a repetition of adhesion and peeling.

Other objects and advantages of the present invention will become apparent from the following description taken with respect to the accompanying drawings, in which:

FIGS. 1A and 1B are plan views of binders embodying the present invention;

FIG. 2A is a sectional view of the first embodiment and FIG. 2B is a sectional view of the same in use;

FIG. 3A is a sectional view of the second embodiment and FIG. 3B is a sectional view of the same in use;

FIG. 4A is a sectional view of the third embodiment and FIG. 4B is a sectional view of the same in use;

FIG. 5A is a sectional view of the fourth embodiment and FIG. 5B is a sectional view of the same in use;

FIG. 6A is a plan view of the fifth embodiment and FIG. 6B is a sectional view of the same;

FIGS. 7–13 are partial plan views of the sixth to twelveth embodiments;

FIG. 14 is a partial sectional view of the thirteenth embodiment; and

FIG. 15 is a partial sectional view of the fourteenth embodiment.

A substrate 1 should be made of a material which has a sufficient mechanical strength such as tensile strength for use as a binder, and a good flexibility, such as plastic or elastomer, or woven or unwoven fabric. It may be composite or laminated material. The binder shown in FIG. 1A is dumbbell-shaped, and the one shown in FIG. 1B is strip-shaped. It may be shaped in any other form. It may have ends shaped round or square as shown, or otherwise. Also, it may have differently shaped ends.

The embodiment of FIG. 2 has a substrate 1, one end 2 of which is covered with an ordinary adhesive layer 4 and the other end 5 of which is covered with a peelable adhesive layer 8, which is covered with an adhesive layer 4. The adhesive layer 4 at either end is covered with a release paper 3. In this embodiment, the adhesive layer 4 at one end 2 is on one side of the substrate and the adhesive layers 4 and 8 are on the other side thereof.

The embodiment of FIG. 3A differs from that of FIG. 2A only in that all the adhesive layers are on the same side of the substrate.

FIG. 2B shows the embodiment of FIG. 2A used to bind a file 9. FIG. 3B shows the embodiment of FIG. 3A used to bind it.

The adhesive for the adhesive layer 4 may be an ordinary pressure-sensitive or heat-sensitive adhesive having a good adhesive power. It should have an adhesive power which is 2,000 g/25 mm or more for 180 degree peeling after a sample 25 mm wide stuck to something with the adhesive and pressed with a rubber roller has been exposed outdoors for one month.

The adhesive for the peelable adhesive layer 8 should have such a weak adhesive power that the adhesive layer 8 can be stuck on and peeled from the substrate 1 repeatedly. Its adhesive power as measured with the abovesaid method should be less than 2,000 g/25 mm, preferably less than 100 g/25 mm for easy peeling. In other words, its adhesive power is so weak as to be effective against a smooth surface, but not against a rough surface. The adhesive power of such an adhesive can be adjusted by adjusting the degree of polymerization, the amount of additives such as a plasticizer and a viscosity increaser, etc. Such an adhesive may be e.g. one manufactured by Nihon Kako Seishi Co., Ltd., known as "ONE TACK N". The peelable adhesive layer may be bonded to the substrate with an adhesive, by hot pressing, hot lamination, etc.

The peelable adhesive layer 8 (and the adhesive layer 4, if desired) may be formed with small holes to adjust the adhesive power at the surface of contact between the substrate 1 and the adhesive layer. A binder with such an adhesive layer formed with small holes can be used as a cap for a container for a perfume to adjust the amount of perfume by displacing the position of the substrate.

The embodiment of FIG. 4A is the same as that of FIG. 2A except that there is provided a film layer 6 between the adhesive layer 4 and the peelable adhesive layer 8. The film layer 6 has a substantially smooth surface. It serves to provide a smooth surface because the adhesive in the peelable adhesive layer 8 is not effective against any rough surface. So long as the film layer 6 provides a smooth surface, it may be made of any organic material (such as plastic) or inorganic material (such as metal), or any laminated body.

In order to adjust the adhesive power at the contact surface between the peelable adhesive layer 8 and the film layer 6, small holes may be formed in one or both of these layers, or the area of contact may be adjusted. Because of its weak adhesive power, the peelable adhesive layer is less liable to smudge with dust than ordinary adhesive layers. But, it should be kept clean.

The embodiment of FIG. 5A is the same as that of FIG. 4A except that there are adhesive layers 4 on the same side of the substrate 1 at either end thereof.

In use, the release papers 3 are peeled to expose the adhesive layers 4. The exposed adhesive layers 4 are then stuck to the covers of a file 9 as shown in FIG. 4B or FIG. 5B. The other end 5 of the binder can be stuck and peeled repeatedly at the contact surface between the film layer 6 and the peelable adhesive layer 8.

The end 5 of the binder may be secured with any other means than an adhesive, such as with a stapler, an eyelet, etc. The peelable adhesive layer may be used at the end 5 of the binder as at its end 2.

The embodiments shown in FIGS. 6A to 15 have one or more holes at one end of the substrate. The embodiment of FIG. 6A has one hole 10. The hole 10 may be replaced with an opening 10' as shown in FIG. 7, or may not be circular, but polygonal. A plurality of holes 10 may be formed as shown in FIGS. 8–10, at spacings therebetween. They may be arranged not in a straight line, but in a staggered way.

An adhesive layer portion 14 is provided on the substrate 1 at the other end. The adhesive layer should be covered with a release paper 3 or a film to keep it clean. Conveniently, a knob portion 12 may be provided at the end provided with an adhesive layer. The adhesive layer portion 14 may be plural instead of single as shown in FIGS. 12 and 13.

The adhesive layer portion 14 may comprise a peelable adhesive layer 8 on the substrate 1, a film layer 6, an ordinary adhesive layer 4, and a release paper 3, one upon another as shown in FIG. 14.

The film layer 6 may be omitted as shown in FIG. 15.

In use, the release paper 3 is peeled and the sheet to be filed is stuck on the adhesive layer 4. The sheet can be peeled at any desired time from between the film layer 6 and the peelable adhesive layer 8 in the embodiment of FIG. 14 and from between the substrate 1 and the peelable adhesive layer 8.

As shown in FIGS. 9 and 10, the substrate 1 may be formed with slits 13 or notches 13' to allow a sheet or document to be inserted therein and allow its front or back side to be stuck to the substrate 1 on the adhesive layer 4.

Since the binders are always on the file by use of its holes 10, the documents cannot get off the file. Because of use of the peelable adhesive layer, any desired document can be removed from the file at any desired time without disturbing the order of the documents filed.

What I claim:

1. A binder for binding a file having a pair of first and second file covers, said binder comprising:
    a substrate of a flexible material having a first end thereof covered with a first adhesive layer for bonding said binder to the first file cover, and a second end thereof covered with a peelable second adhesive layer,
    a sheet of release paper covered on said first adhesive layer,
    a third adhesive layer covered on said peelable second adhesive layer for bonding said binder to the second file cover, and
    a sheet of release paper covered on said third adhesive layer.

2. A binder as claimed in claim 1, wherein said first adhesive layer and said peelable second adhesive layer are on opposite sides of said substrate.

3. A binder as claimed in claim 1, wherein said first adhesive layer and said peelable second adhesive layer are on the same side of said substrate.

4. A binder as claimed in claim 1, wherein a film layer having a smooth surface is interposed between said third adhesive layer and said peelable second adhesive layer.

5. A binder as claimed in claim 2, wherein said first adhesive layer and said peelable second adhesive layer are on opposite sides of said substrate.

6. A binder as claimed in claim 2, wherein said first adhesive layer and said peelable second adhesive layer are on the same side of said substrate.

* * * * *